United States Patent [19]
Milner

[11] 3,928,135
[45] Dec. 23, 1975

[54] PROCESS FOR THE PRODUCTION OF GLUCOSE POLYMERS
[76] Inventor: Jeremiah Milner, 41, N. John St., Liverpool, L2 6SE, England
[22] Filed: May 2, 1973
[21] Appl. No.: 356,550

[30] Foreign Application Priority Data
May 2, 1972 United Kingdom............... 20320/72

[52] U.S. Cl.................... 195/31 R; 195/7; 195/119; 424/180
[51] Int. Cl.² ........................................ C12D 13/02
[58] Field of Search ......... 424/180; 195/31 P, 31 R, 195/7, 4, 11

[56] References Cited
UNITED STATES PATENTS

| | | | |
|---|---|---|---|
| 2,891,869 | 6/1959 | Langlois | 195/31 R |
| 3,067,098 | 12/1962 | Pool | 424/180 |
| 3,756,853 | 9/1973 | Meyer | 127/38 |
| 3,788,946 | 1/1974 | Kurimoto et al. | 195/31 R |
| 3,793,461 | 2/1974 | Yuen | 424/180 |

FOREIGN PATENTS OR APPLICATIONS

| | | | |
|---|---|---|---|
| 1,274,506 | 5/1972 | United Kingdom | 195/31 R |
| 1,203,048 | 8/1970 | United Kingdom | 195/31 R |

OTHER PUBLICATIONS

Bott et al., "Studies with Caloreen, a Glucose Polymer Mixture," The Pharmaceutical Journal, May 1970, pp. 583-584.

Berlyne et al., "A Soluble Glucose Polymer for Use in Renal Failure and Caloric-Deprivation States," The Lancet, April, 1969, pp. 689-692.

Mallick et al., "Blood Glucose, Serum Insulin and Growth Hormone After an Oral Challenge with Caloreen, in Normal Diabetic and Uraemic Subjects," Paper present at Freiburg Conference (June 1971).

Primary Examiner—A. Louis Monacell
Assistant Examiner—Thomas G. Wiseman
Attorney, Agent, or Firm—Browne, Beveridge, Degrandi & Kline

[57] ABSTRACT

Glucose polymers having therapeutic value in warm-blooded animals without the sweetness and hyperosmolarity in veins or intestinal tissues attendant with liquid glucose.

13 Claims, No Drawings

PROCESS FOR THE PRODUCTION OF GLUCOSE POLYMERS

BACKGROUND OF THE INVENTION

The present invention concerns improvements in and relating to glucose polymers, which have therapeutic value in man and animals.

Liquid glucose is a material which has been used to supplement caloric intake in patients suffering from acute and chronic renal failure but it has some disadvantages. For example, it has too high a content of monosaccharides and other low molecular weight sugars such as maltose and maltotriose. Such low molecular sugars increase to osmotic pressure of solutions.

According to the present state of the art at least two types of glucose polymers are known.

These polymers arise as a consequence of the art of starch hydrolysis. These hydrolyses do not take care of the special types of glucose polymers which are beneficial to sick people, nor do the known processes take care of the advantages of glucose polymers over glucose in the treatment of various illnesses in man and animals.

The processes of the prior art may produce too much glucose, too much salts, too many long polymers, too much branching in long polymers, or too much branching in short polymers. The processes of the prior art are not sufficiently selective in their use of raw material starches. Thus the composition of the products arising from such processes may be unstable in the usage required by medicine. They may in turn be inefficient in the medical usage, as well as being potentially toxic by acting as osmotic diuretics. Such compositions would be classified as inefficient, toxic and dangerous and would not be considered as mixtures of glucose polymers which have potential therapeutic value in man and animals especially intravenous applications.

Glucose polymers prepared from suitable selected starting material enable energy to be made available to patients whilst avoiding the problems associated with glucose itself such as sweetness, and hyperosmolarity in veins or in the intestinal tissues. Therefore administrations of glucose polymers can aid recovery and can be of great value in pre- and post-operative surgery. The polymers are also of value in providing energy in the case of failures of organs such as the kidney, liver, pancreas or intestine.

SUMMARY OF THE INVENTION

According to the present invention there is provided a method for the production of glucose polymers which comprises (a) hydrolysing starch containing no more than 20% of amylopectin by means of an enzyme, (b) heating the resulting mixture in solution to destroy the enzyme, (c) removing electrolytes by passing the mixture through an ion-exchange resin or by making a solution of the mixture in water, adding an alcohol to form a dextrin precipitate leaving the electrolytes in solution, dissolving the precipitate in aqueous alcohol, and distilling off the alcohol (d) boiling the solution to reduce pyrogens, (e) passing the solution through a candle or Seitz filter to remove bacteria and unwanted protein substances, (f) removing glucose by dialysis or by means of a dextran resin column and (g) removing the long chain dextrins by fractionation with alcohol. It is preferred to concentrate the solution both before and after removal of the glucose. If necessary any remaining pyrogens can be removed after step (g) by treating the solution with activated charcoal or by passing the solution through an exchange resin.

The invention includes the glucose polymers prepared by the process of this invention.

DESCRIPTION OF THE PREFERRED EMBODIMENTS

The starch to be treated should be washed with water to remove all water-soluble substances and preferably should be free from copper, lead, arsenic and other heavy metal contaminants. Also it should be free from insecticidal contamination or other pest control substance which a grower might use.

The enzyme used for the hydrolysis is preferably a bacterial alpha amylase and the amount used determines the time required for hydrolysis. It is preferred to carry out the hydrolysis in a buffer solution at a pH of about 6.5 e.g., an isotonic phosphate saline buffer. This may then be diluted with a boiling buffer solution to give the desired starch content. A suitable concentration is about 2.5% by weight. The solution is preferably stirred and cooled to about 75° C. and the enzyme is suspension is then added and the hydrolysis is then allowed to take place for several hours, e.g., about 5 hours.

Dextrinisation of the starch should be followed in conjunction with observing the formation of glucose. Hydrolysis should be stopped when the true glucose level rises to about 3% by weight of the total dextrins. Total reducing power can be taken as a measure of the dextrins present. Hexokinase can be used to assess the true glucose.

The hydrolysis may also be monitored by thin-layer chromatography, paper chromatography or by column chromatography on dextran resin and elution. The mean distribution of the molecular size of the polymer mixture can be estimated in this way.

The solution is then heated to inactivate the enzyme and the heating may be continued to induce maximum protein coagulation.

The solution is then treated to remove electrolytes such as sodium or potassium chloride. This may be carried out by cooling and passing the solution through an ion-exchange resin, preferably a mixed bed resin. Alternatively the electrolytes may be removed by taking a concentrated solution or the starch hydrolysate in water and adding an equal volume of 95% by volume alcohol, and mixing thoroughly. Substantially most of the monosaccharides will remain in solution and also the mineral salts. The solution is then filtered and the oligosaccharide precipitate may then be washed with further alcohol. The precipitated oligosaccharides may then be treated with an aqueous alcohol solution of 10% by volume of alcohol. This will dissolve all the lower oligosaccharides, which are most useful in medicine, and leave in the precipitate the unwanted larger polymers. A number of solvents may be used to carry out the above separation. Ethanol is preferred because of safety and low toxicity especially in relation to a substance which may end up in the vascular system of man or animals.

No solvent or precipitating agent may be used which carries a pharmacological hazard. The aqueous alcohol solution of glucose polymers may now be heated and the alcohol distilled off.

The resulting solution may then be treated with activated carbon if desired.

The solution is then boiled to reduce pyrogens and passed through a candle or Seitz filter fine enough to remove bacteria and to remove further traces of protein. After this the solution may be concentrated and treated to remove unwanted glucose.

The solution may then be concentrated again, reheated and the long chain dextrins (which constitute some 10% by weight of the total) removed by fractionation with alcohol. Finally any remaining pyrogens can be removed as described above.

The product obtained by the process described above can now be considered clean enough to be used for oral administration to man or animals in a state of either acute or chronic illness. The product may be presented as a liquid concentrate or powder.

If desired the glucose polymers may be admixed with other substances which enhance their therapeutic value such as for example cortisone if the polymers are to be used to treat a patient having a defective intestine. Cortisone increases the efficiency of the glucose polymer in this case by increasing the area of absorption in the intestine thus improving the efficiency of the glucose polymers as a source of energy.

Glucose polymers are of particular value in liver and kidney failure. More efficient use of low protein intakes is permitted. Such organs actively involve transaminase enzymes and pyridoxin increases the activity of such enzymes. Thus addition to pyridoxin to the glucose polymer will increase its efficiency in restricted protein intake.

The glucose polymers may be a direct source of glucose in the free body fluids, but also may be a source of maltose, a sugar which may be directly metabolised to glucose by many body cells.

When glucose polymers are used orally they are acted on to some extent by amylases of the digestive tract, but are in the main an active substrate for the brush border cells of the intestine. Through the activity of the intra-cellular enzymes of the gut the polymers yield glucose directly to the blood. Glucose is yielded to the blood at a rate no less fast than had an equivalent amount of glucose been used. Insulin and growth hormone are equally stimulated.

It has been found that glucose polymers can be administered intravenously and when they are directly infused into the blood they are acted on by the amylase enzymes of the blood. These enzymes exist as overflow into the vascular system from the various organs of secretion. The enzymes are not known to be specially secreted into the blood for any known purpose. The amylase enzymes of the blood will convert the glucose polymers in the main to maltose with a small amount of glucose. The further degradation of maltose requires maltase, an enzyme which has never been shown to be present in the free fluids of the vascular system. However many of the cells which are bathed in the free fluids have the ability to metabolize maltose directly as, for example, does a yeast cell in a fermentation liquor. The maltose may go directly to glycogen in the cell and from glycogen to glucose within the cell and thence to carbon dioxide and energy, By this process the glucose polymers can go directly to carbon dioxide and energy in animal tissues without involvement of insulin. Therefore while an infusion of glucose is almost in the main handled by an insulin dependent system, an infusion of glucose polymers may be degraded mainly by a system of cell assimilation which is entirely independent of insulin.

If the glucose polymers are required for intravenous use then the product obtained by the process described above may be further treated by having its pH adjusted to a value of from 6.8 to 7.2 followed by sterilization for example by heat. Preferably the solution is again filtered through a candle or Seitz filter fine enough to remove bacteria before adjusting the pH. This invention avoids the use of high amylopectin-containing starches which have a high percentage of 1,6-branch linkages which can only be hydrolysed by intra cellular enzymes. Branched dextrin of the 1–5 type may render an intravenous application of the final glucose polymer inefficient and possibly dangerous. The 1-6 linked polymers may behave as osmotic diuretics and be excreted readily by the kidneys.

It is preferred that glucose units in the polymers linked in the 1,6 position constitute no more than 5% of the total linkages.

It is even more preferred that instead of subjecting starch to hydrolysis with the enzyme one should use only the amylose fraction of the starch.

The invention also includes the novel glucose polymers that are suitable for intravenous use which comprise a mixture of polymers each of which is substantially no more than ten glucose units long. The difference between this intravenous product and the oral product is that the oral product also contains a proportion, e.g. 10% by weight of polymers more than ten glucose units long, and may have present an unspecified number of 1–6 linked units.

The novel polymers of this invention are stable on long storage in concentrated form even in the presence of amino acids. They are non-injurious to veins when injected into man, are degraded by the serum enzymes of normal man, and when so degraded are capable of metabolism to carbon dioxide and energy either with or without insulin. They can maintain a steady raised glucose level in blood on continuous infusion into man and in a fasting subject they cause a steady rise in the respiratory quotient.

The glucose polymers, produced by the present invention have a number of advantages. The elimination of electrolytes such as sodium and potassium enables the full amount of calories to be given to the patient with little or no risk of fluid retention or rise in blood pressure, or cardiac embarrassment. Further elimination of the protein substances removes the danger of shock in very ill patients when used intravenously.

In addition to supplying energy the metabolisable glucose polymers greatly reduce the need for amino acids in protein building.

This protein sparing property of the polymers depends on the transaminase activity which, under stress or deficiency, e.g., renal failure, can be helped by admixing pyridoxin, a coenzyme, with the polymers.

The glucose polymers also readily yield glucose to the Krebs cycle either directly via insulin or via maltose to enter the glycogen    glucose    Krebs cycle within the cells. This supplies energy as well as intermediate carbon compounds in the metabolic cycle.

A further property is in stimulating the pancreas to release insulin when the polymers are administered orally. This shows a difference between normal release of insulin and low release of insulin in a diabetic patient. It is therefore useful in diagnosing or cross-checking the diagnosis of diabetes.

Patients with acute disease of the metabolic and endocrine systems may be maintained in a steady state of positive energy intake by the intravenous use of the polymers. Similarly by utilizing non-insulin systems specific tissues may now be relatively more active. In the presence of cancers and tumors such relative activity may be of potential therapeutic value.

The invention therefore includes a process for the treatment of metabolic and endocrine disease in man or animal, for example, based on kidney, liver, pancreas or intestine failure, which comprises administering intravenously a solution containing at least 20% W/V, preferably 25% W/V, of a mixture of polymers each of which is substantially no more than 10 glucose units long.

The upper unit of concentration is determined by the fact that the solution must be able to pass through the needle.

There is no specific dosage unit but the quantity to be administered is related to the calorific requirement of each patient.

Glucose is the standard substance for use in intravenous alimination. In conjunction with insulin glucose is rapidly transported especially into muscle cells, thereby providing energy. Glucose polymers on the other hand have to be degraded by enzymes. These enzymes are of the amylase type and are present only as overflow from the secreting glands into the blood. They are not specially secreted into the blood and it is not known that the levels of secretion into the blood can be increased.

The known state of this art suggests that there is a sufficiency of amylase activity present in normal sera of man to provide from the glucose polymers approximately a total energy of 2000 K.calories per 24 hours.

Now the glucose polymers will in the main, as a result of the amylase activity, be converted to maltose in the serum. Maltose must be acted on by the enzyme maltase before it is converted to glucose. The known state of the art suggests that the enzyme maltase is absent in free fluids of the body. However, many body cells, such as skin cells, red and white blood cells and liver cells appear to have the possible mechanisms to assimilate maltose directly into the cell. Within the cells it may be directly broken down to glucose, or built into glycogen. In both cases the maltose can be directly metabolised to carbon dioxide and energy.

Glucose polymers thus have two potential pathways of metabolism (1) via insulin and glucose and (2) via cell assimilation as maltose. These two pathways may well reflect differential metabolism of body cells in terms of glucose and glucose polymers. The present invention makes it possible to examine the second pathway. It is possible that this pathway may have application in understanding all forms of diabetes. It is also possible that such a pathway may be of value in the possibility of selective nutrition of groups of body cells. Such a selective nutritional approach to body cells is a growing feature in dealing with regulation and control of tumor growths.

Tumor cells may well prove to be insulin dependent and prior to the present invention it has not been possible to supply energy to the body as a whole without simultaneously increasing insulin.

The invention will be illustrated with reference to the following Examples. In these Examples the novel polymers of the invention are, for the sake of convenience, referred to as Caloreen I.V.

EXAMPLE 1.

A clean corn starch containing no more than 20% amylopectin was washed several times with water to remove watersoluble substances. The starch was suspended in an isotonic phosphate saline buffer at a pH of 6.5 and this was poured into a larger volume of boiling buffer solution to give a starch concentration of 2.5% by weight. The solution was carefully stirred and cooled to 75° C.

The solution was retained at this temperature and a suspension of bacterial alpha amylase was added (100 mg in 10 ml buffer). The suspension was then incubated for about 5 hours. The solution was then boiled to inactivate the enzyme and then for a further hour to induce maximum protein coagulation. It was then cooled and passed through a column of a mixed bed resin.

The solution was then boiled and passed through a candle filter of fine porosity which removed particles of $0.5\mu$ in size to remove further traces of protein. The solution was then concentrated to about 40% W/V and pumped through a dialysis machine to reduce unwanted glucose. The pumping was continued for about 4 hours using a 4 inch dialysis tube. 95% ethanol was then added to the solution of the glucose polymers with continuous stirring until a concentration of 10% alcohol was achieved. The larger polymers then settled out and were filtered off. The filtrate was then evaporated until the alcohol was distilled off. The solution was then re-heated and passed through a bed of activated charcoal.

For oral use the product can be dried at this stage.

For intraveneous use the resulting solution was again filtered through a fine candle filter and the pH adjusted to 6.8 to 7.2. The solution (Caloreen I.V.) was then put into bottles, sealed and sterilized by autoclaving for 30 minutes at 20 lbs per square inch.

EXAMPLE 2.

A group of 10 female Swiss-Webster (Wisconsin) mice weighing 16–24 grams respectively were each intravenously fed the equivalent of 12.5 grams/kg. of body weight of a 25% Caloreen I. V. solution and then observed for 7 days thereafter. None of the mice dies during that 7 day observation period.

Thus, it was determined that the $LD_{50}$ (lethal dose for 50% of the mice) for the tested sample of Caloreen I.V. exceeds a dosage of 12.5 grams/kg. of body weight in mice. That dosage is the equivalent of 3500 c.c. or 875 grams/70 kg. of body wight in adult humans.

Therefore, by standard, accepted pharmacological studies, the tested sample of Caloreen I.V. was determined to be nontoxic to humans when intravenously administered.

EXAMPLE 3

When a group of 10 female Swiss-Webster (Wisconsin) mice weighing 16–24 grams respectively were each intravenously fed the equivalent of 12.5 grams/kg. of body weight of a 25% Caloreen I.V., plus 5% amino acids solution and observed for 7 days thereafter, the same results and determinations as those stated in Example 2 were obtained.

EXAMPLE 4.

A mature, female beagle dog (No. 386) weighing 4.0 kgs. was fasted overnight. A total of 240 ml. of a 25%

Caloreen I.V. solution was then infused into a lateral saphenous vein of the dog at 4 ml./minute for 1 hour. Baseline blood samples were collected from the dog just prior to initiation of the infusion. During the infusion, blood samples were collected at 15 minute intervals. Thereafter, they were collected at 30 minute intervals for 1 hour post-infusion. The blood samples were subsequently analyzed for serum glucose and immuno-reactive insulin. Also, the urinary bladder of the dog was catherized and urine samples were collected at the same intervals as the blood samples were. The total volume of urine excreted during each time interval was noted and each sample was analyzed for glucose concentration.

This infusion produced hyperglycemia of a 3 to 4 fold increase in serum glucose concentration, diuresis and glycosuria in the dog within 15 minutes of the initiation of the infusion and all during the infusion, but did not cause an appreciable elevation of serum immuno-reactive insulin levels. Because the method employed for these analyses is specific for glucose, these results indicate that the Caloreen I.V. was rapidly hydrolyzed by the dog to glucose.

EXAMPLE 5.

A mature, female beagle dog (No. 2294) weighing 3.8 Kgs. was fasted overnight. A total of 240 ml. of a 25% Caloreen I.V. solution was then infused into a lateral saphenous vein of the dog at 1 ml./minute for a period of 4 hours. Baseline blood samples were collected from the dog just prior to initiation of the infusions. During the infusions, samples were collected at 15 minute intervals for the first hour. Thereafter, they were collected at 30 minute intervals through one hour postinfusion. The blood samples were subsequently anaylzed for serum glucose and immuno-reactive insulin. Also, the urinary bladder of the dog was catherized and urine samples were collected at the same interval as the blood samples were. The total volume of urine excreted during each time interval was noted and each sample was analyzed for glucose concentration.

This infusion of the 25% Caloreen I.V. solution produced hyperglycemia, diuresis and glycosuria in the dog substantially identical to that of the dog in Example 4, and again did not cause an appreciable elevation of serum immuno-reactive insulin levels, notwithstanding the difference in the rate of infusion.

Examples 2 and 3 demonstrate the non-toxicity of the glucose polymers and Examples 4 and 5 demonstrate, that dogs can readily hydrolyse these polymers to simple glucose.

The results of the tests of Examples 4 and 5 are given in the following Table.

Table

Serum and Urine Glucose Levels, Serum Insulin Levels, and Urine Production Rates

| Dog No. | Rate of Infusion (ml/min) | Time From Start (min) | Serum Glucose Concentration (mg%) | Serum Insulin Level (uU/ml) | Urine Total Output (ml) | Urine Rate (ml/min) | Urine Glucose Concentration (mg%) |
|---|---|---|---|---|---|---|---|
| 386 | 4 | 0-Baseline | 94 | 15 | — | — | 4.7 |
| | | 15 | 360 | 23 | 10.0 | .67 | 97.1 |
| | | 30 | 402 | 7 | 35.0 | 2.33 | 97.4 |
| | | 45 | 397 | 22 | 35.0 | 2.33 | 95.2 |
| | | 60* | 384 | 22 | 54.0 | 1.80 | 95.7 |
| | | 90 | 389 | 11 | 52.0 | 1.73 | 97.8 |
| | | 120 | 354 | 18 | 16.0 | .53 | 102.8 |
| 2294 | 1 | 0-Baseline | 126 | 11 | — | — | 3.7 |
| | | 15 | 232 | 11 | 5.0 | .33 | 16.7 |
| | | 30 | 313 | 19 | 4.4 | .29 | 13.3 |
| | | 45 | 342 | 15 | 6.2 | .41 | 10.8 |
| | | 60 | 381 | 5 | 7.8 | .52 | 13.1 |
| | | 90 | 388 | 32 | 18.0 | .60 | 21.4 |
| | | 120 | 396 | 30 | 22.0 | .73 | 25.6 |
| | | 150 | 411 | 10 | 29.0 | .97 | 24.2 |
| | | 180 | 380 | 23 | 32.0 | 1.07 | 21.8 |
| | | 210 | 388 | 11 | 40.0 | 1.33 | 15.6 |
| | | 240* | 372 | 17 | 38.0 | 1.27 | 14.3 |
| | | 270 | 203 | 8 | 17.0 | .57 | 20.0 |
| | | 300 | 161 | 8 | 5.0 | .17 | 30.9 |

*Infusion ended.

What I claim is:

1. Process for the production of glucose polymers which comprises
   a. hydrolysing starch containing no more than 20% of amylopectin by means of an $\alpha$-amylase enzyme is a buffer solution at a pH of about 6.5,
   b. heating the resulting mixture in solution to a sufficiently elevated temperature to destroy the enzyme, stopping the hydrolysis reaction when the glucose level rises to about 3% by weight of the total dextrins,
   c. removing electrolytes by passing the mixture through a ion-exchange resin or by making a solution of the mixture in water adding an alcohol to form a dextrin precipitate leaving the electrolyte in solution, dissolving the precipitate in aqueous alcohol and distilling off the alcohol,
   d. boiling the solution to reduce pyrogens,
   e. passing the solution through a candle or Seitz filter to remove bacterial and unwanted protein substances,
   f. removing glucose by dialysis or by means of a dextran resin column, and
   g. removing the long chain dextrins by fractionation with alcohol and thereafter recovering glucose polymers in which glucose units in the polymers linked in the 1,6-position constitute no more than 5% of the total linkages.

2. Process as claimed in claim 1 in which the solution is concentrated before the removal of the glucose.

3. Process as claimed in claim 1 in which the solution is concentrated after the removal of the glucose.

4. Process as claimed in claim 1, in which any pyrogens remaining after step (g) are removed by treating the solution with activated charcoal or by passing the solution through an exchange resin.

5. Process as claimed in claim 1 in which the starch is free from water-soluble substances, heavy metal contaminants and any pest control substances.

6. Process as claimed in claim 1 in which the starch content of the solution to be hydrolysed is about 2.5% by weight.

7. Process as claimed in claim 1 in which the heating in step (b) is continued to induce maximum protein coagulation.

8. Process as claimed in claim 1 in which the ion-exchange resin of step (c) is a mixed bed resin.

9. Process as claimed in claim 1 in which the alcohol of step (c) is ethanol.

10. Process according to claim 1 in which between step (c) and step (d) the solution is treated with activated charcoal.

11. Process as claimed in claim 1 in which after step (g) the pH is adjusted to a value of from 6.8 to 7.2 followed by sterilisation.

12. Process as claimed in claim 1 in which the solution is filtered through a candle or Seitz filter before adjustment of the pH.

13. Process as claimed in claim 1 in which the starch of step (a) is replaced by amylose.

* * * * *